United States Patent [19]

Webb

[11] Patent Number: 4,761,731

[45] Date of Patent: Aug. 2, 1988

[54] LOOK-AHEAD INSTRUCTION FETCH CONTROL FOR A CACHE MEMORY

[75] Inventor: David M. Webb, Blaine, Minn.

[73] Assignee: Control Data Corporation, Minneapolis, Minn.

[21] Appl. No.: 765,427

[22] Filed: Aug. 14, 1985

[51] Int. Cl.[4] .................................. G06F 9/38;9/00
[52] U.S. Cl. ............................................. 364/200
[58] Field of Search ... 364/200 MS File, 900 MS File

[56] References Cited

U.S. PATENT DOCUMENTS

| | | | |
|---|---|---|---|
| 3,573,854 | 4/1971 | Watson et al. | 340/172.5 |
| 3,699,535 | 10/1972 | Klein | 340/172.5 |
| 3,736,567 | 5/1973 | Logan et al. | 340/172.5 |
| 3,928,857 | 12/1975 | Carter et al. | 340/172.5 |
| 4,040,030 | 8/1977 | Cassonnet | 364/200 |
| 4,110,822 | 8/1978 | Porter et al. | 364/200 |
| 4,168,523 | 9/1979 | Chari et al. | 364/200 |
| 4,298,927 | 11/1981 | Berglund et al. | 364/200 |
| 4,384,342 | 5/1983 | Imura et al. | 364/900 |
| 4,408,275 | 10/1983 | Kubo et al. | 364/200 |
| 4,439,828 | 3/1984 | Martin | 364/200 |
| 4,561,052 | 12/1985 | Tateno | 364/200 |
| 4,583,163 | 4/1986 | Kobayashi et al. | 364/200 |
| 4,594,659 | 6/1986 | Guenthner et al. | 364/200 |

Primary Examiner—Gareth D. Shaw
Assistant Examiner—Kevin A. Kriess
Attorney, Agent, or Firm—R. M. Angus; J. A. Genovese

[57] ABSTRACT

Certain stored program digital computer systems employ a single central memory to which requests are made for individual instruction words stored within it. Certain types of these memories employ address queues in which requests may be temporarily stored when requests come in more rapidly than the central memory can service them. A write valid memory records each central memory request and provides a status signal which can be used to prevent placing of a further request for the word at an address in the queue.

4 Claims, 2 Drawing Sheets

LOOK-AHEAD INSTRUCTION FETCH CONTROL FOR A CACHE MEMORY

BACKGROUND

Stored program digital computer systems typically include an addressable central memory in which are stored instructions and operands used during data processing operations. Access to certain types of such central memories employs a protocol using an address input path carrying a signal encoding a central memory address. The address encoded thereon is transferred to the memory when a request signal is placed on a request line. The request signal causes the memory to accept the address and provide the word specified by the address as the output. Further, to deal with a situation where memory requests occur more rapidly than the memory can respond, one can employ address queue or pipeline circuitry in which each address accompanying a request signal may be temporarily stored until or while being answered.

Such digital computers also frequently employ high-speed buffer or cache memories in which both instructions and operands may be stored. In situations where several or frequent references are made to a particular instruction or operand, and the number of the references to the other instuction or operands between each reference to a particular one is not too great, a relatively small high-speed buffer memory can substantially increase the overall processing speed for two reasons. On the one hand, it is possible to reduce the number of references to the relatively slow central memory, and secondly, individual instructions and operands can be made available much more rapidly to the various sections of the computer This invention is intended to operate mainly with a buffer memory intended to store instructions, although there is no theoretical reason why it cannot with modifications be applied to those storing operands as well.

When a central memory is used to store instructions and supply them to an instruction word buffer memory, it is convenient to provide with each instruction word central memory address supplied to the central memory, the instruction word buffer address specifying the instruction word buffer memory storage location at which the retrieved instruction word should be stored. As each of these central memory addresses are shifted along the address queue or pipeline, the instruction word buffer address is shifted with it and issued with the instruction word to identify the buffer memory location for storing the associated instruction word.

Further, in such computers, it is conventional that an instruction processor is provided to execute individual instruction words from the instruction word buffer memory. To provide continuity in instruction execution, each instruction word specifies in some way the central memory address of the next instruction word to be executed. A buffer addressing control receives each such central memory address specified and assigns an instruction word buffer address to the central memory address if one has not yet been assigned, or if an instruction word buffer address has already been assigned to the central memory address for the next instruction word buffer address, determines this buffer address assignment. Lastly, if the instruction word buffer memory is full and no prior assignment of central memory address to buffer address exists, the buffer addressing control selects an instruction word buffer address currently assigned to a central memory address and changes its assignment to the new central memory address.

Should the instruction word buffer contain a complete instruction loop which is executed repeatedly, execution can proceed very rapidly after the first time through because no central memory references for currently executed instruction words are needed. If during this time instructions likely to be executed after those currently being executed are requested from central memory, processing speed can be further increased. Such look-ahead apparatus is common in computers of this type. If the programs executed on such machines are properly designed, it is possible for their execution to occur with very little waiting for instructions to be requested from central memory, since the look-ahead apparatus has pre-fetched most instructions prior to their addresses being actually specified.

Further discussion of these and related considerations is present in the following references: U.S. Pat. Nos. 3,928,857; 4,110,822; 3,573,854; 3,736,567; and 3,699,535. In particular, U.S. Pat. No. 3,928,857 is deemed to be the art closest to the invention described below.

BRIEF DESCRIPTION OF THE INVENTION

A problem which adversely affects the efficiency with which instruction words are requested from central memory occurs when a first reference to a particular central memory address generates a read request and is followed by a second reference to the same address before the first read request is answered. This may happen in a computer with the above-mentioned look-ahead capability, where individual instruction words further ahead in the instruction sequence than the instruction word currently under execution, may possibly be re-requested from central memory if look-ahead is interrupted. The situation can arise also in a multiprocessor configuration, where individual processors may be executing the same instructions from a common buffer memory. It is advantageous to prevent such second and later references directed to a single central memory address from generating additional requests, because it can in certain circumstances occur frequently enough to appreciably affect the response of central memory, and therefore slow instruction execution. My invention is directed to a mechanism preventing such multiple requests by using the instruction word buffer address assigned to the central memory address to define each request to central memory. A write valid memory is provided which has a plurality of storage locations each of which store a status word and each of which has an address associated with an address of the instruction word buffer. Preferably both memories employ the same address set, with equal address values associated. When a request is sent to central memory for an instruction word to be read and placed in a specified instruction word buffer address, the location having the associated address in the write valid memory is set to a second value. Each time the buffer address assignment means changes the central memory address assignment for an instruction word buffer address, the corresponding status word in the write valid memory is set to a first value. This first value is then again changed to the second value when the central memory address is placed in the address queue or pipeline.

When a subsequent reference to that central memory address occurs, the buffer address assignment means detects the previously made assignment to that central memory address of its instruction word buffer address. The instruction word buffer address association with the write valid memory location is used to read the write valid memory status word and supply a status signal to disable the request to central memory.

Accordingly, one purpose of this invention is to increase the speed of processing of the computer of which it forms a part.

Another purpose is to reduce the length of an address queue needed to efficiently operate such a central memory.

Still another purpose is to reduce the overall number of references needed to such a central memory.

DESCRIPTION OF THE PREFERRED EMBODIMENT

Figure 1:
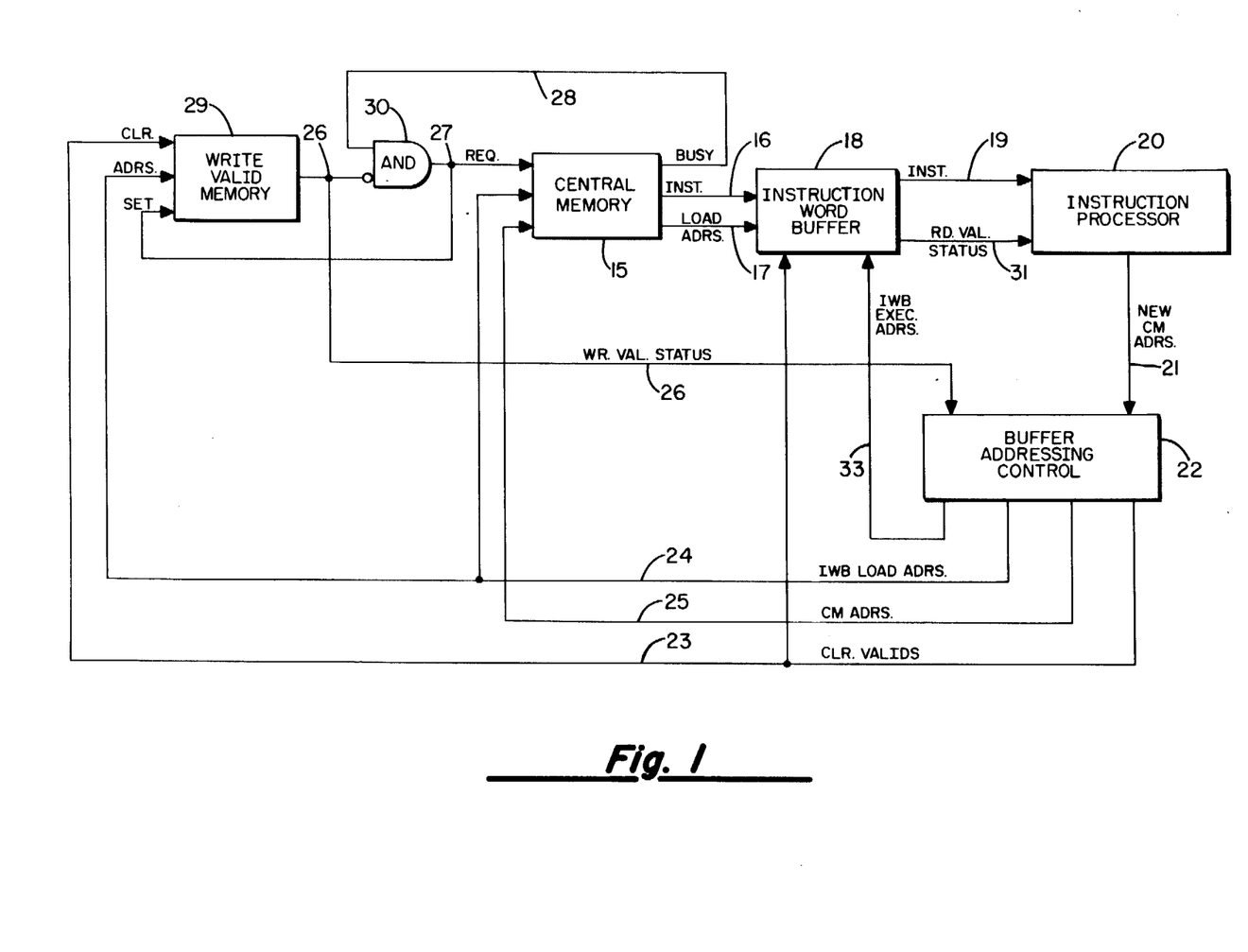
FIG. 1 is a block diagram illustrating the essential parts of the invention in a generalized environment.
Figure 2:
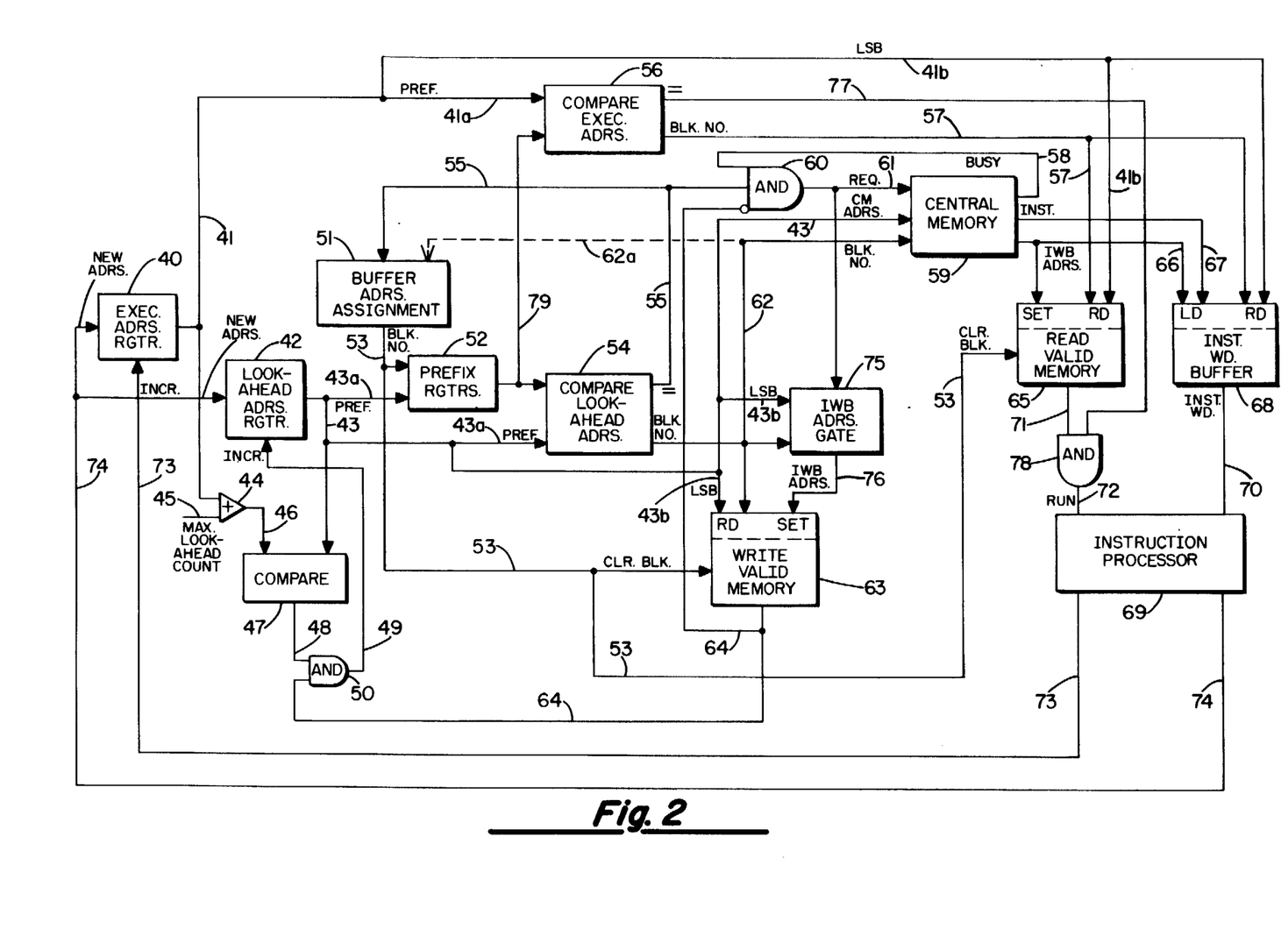
FIG. 2 is a block diagram of a preferred embodiment of the invention in a digital computer system block diagram which includes an instruction look-ahead feature.

Before discussing the invention as represented by FIGS. 1 and 2, it should be understood that the timing of individual elements' activities is not in some cases explicitly shown in FIGS. 1 and 2. The timing is in these cases inferrable for those having ordinary skill in the art. Critical or non-obvious timing relationship are explicitly explained or defined. Individual signal paths shown in FIGS. 1 and 2 may carry a single control signal or represent the transmission of a number of parallel bits, which typically will be an address or the contents of a storage location. The context serves to make these conditions clear. In both FIGS. 1 and 2, individual functional blocks typically represent a number of individual logic circuits which cooperate to perform the function with which the block is labeled and which is described for it. Control signals are in general defined as having logical 0 and logical 1 values, or first and second values which have some predetermined relationship which the text will make clear. Further, a control function is implied for most of the several data signals, in that arrival of a particular data signal generates the expected action by the functional block. In actual designs, there are typically provided separate gate or clock signals to signal that the block's function should commence. Most of these details have been omitted so as not to obscure the actual invention and its operation.

Turning first to FIG. 1, therein is shown a generalized block diagram of a digital computer system including a write valid memory 29 which, together with AND gate 30 comprise the heart of the invention in this system. A central memory 15 stores individual instruction words in addressable locations. Central memory 15 will eventually provide an instruction word encoded in a signal on data path 16 when the desired central memory address is encoded in a signal on data path 25 and a request signal is presented on data path 27. (Note that paths 16 and 17 represent multibit signals; path 27 represents a single control bit.) When the request signal appears on data path 27, the central memory address on path 25 is accepted by central memory 15 and placed in an address queue or pipeline which is internal to central memory 15. Such digital computer memories are easily designed by those skilled in the art, and no further discussion of them is necessary. It is contemplated here that an address placed in such an address queue or pipeline will be sequentially shifted through the queue or pipeline until it finally is the oldest still remaining, at which time the data at the central memory 15 location specified by it is extracted and the instruction or other data contained therein is encoded in the signal on data path 16. It is convenient in this application to provide the address queue within central memory 15 with the additional capability of carrying with each individual central memory address an instruction word buffer (IWB) address as well, which is provided in the signal on path 24 concurrently with its central memory address on path 25. The instruction word buffer address is placed in the signal on data path 17 at the same time that the instruction associated with it is encoded and placed on data path 16. Finally, central memory 15 also produces a busy signal on path 28 having a first value whenever the address queue has a predetermined number of central memory addresses in it, i.e., is filled and produces a busy signal having a second value otherwise. It is assumed that a sequence of instructions to be executed is pre-existing in central memory 15. How these instructions are placed in central memory 15 is not relevant to this discussion.

Instruction word buffer 18 receives for each request signal a central memory signal comprising an instruction word encoded in the signal on path 16 and the instruction word buffer (IWB) address associated therewith encoded in the signal on path 17 and responsive to them stores the instruction word at the location specified by the IWB address on path 17. Buffer 18 also includes a read valid indicator (which may be a single bit) in association with each IWB storage location. Each read valid indicator has first and second values. Each time an instruction word is loaded into an instruction word buffer 18 storage location, the associated read valid indicator is set to its second value. How it is set to its first value will be explained shortly.

An IWB address encoded in the signal on path 33 specifies a storage location in instruction word buffer 18 and causes the instruction word in that storage location and the status of its associated read valid indicator to be encoded in the instruction word and read valid status signals on paths 19 and 31 respectively. The read valid indicator status for a particular IWB storage location is cleared or set to its first value by placing its IWB address in the signal on path 23. This cleared status can be assumed to be immediately available on path 31, along with the associated instruction word on path 19. In a preferred embodiment incorporating the invention, the address carried on path 23 may specify a group of sequential IWB addresses, in which case all of the specified locations are set to their first values.

Instruction processor 20 receives individual instruction words encoded in the signal on data path 19 from instruction word buffer 18. Each instruction word is accompanied by a signal on path 31 encoding the associated read valid indicator status Instruction processor 20 executes individual instruction words when and only when the accompanying read valid indicator has its set or second value, i.e., is not cleared. Whenever the read valid indicator has its first or cleared value, instruction processor 20 temporarily ceases execution of instruction words.

For purposes of this invention, it is important to note that each execution of an instruction word causes processor 20 to generate either explicitly or implicitly a further reference to another central memory address which specifies the location of the next instruction word. To make this more concrete, it is well known that instruction words are typically ordered in sequential series of central memory addresses where a constant, usually 1, can be added to any address (except the last in the memory) to determine the next sequential address. Those instruction words which specify branching specifically define the address of the location from which the next instruction word to be executed. Other instructions implicitly define the next instruction word as coming from the location whose address is next in sequence. Special purpose address definitions as caused by interrupt or breakpoint operations can be dealt with as special cases and need not be considered here.

Instruction processor 20 accomplishes both types of address generation internally and places the central memory address defined by each current instruction word signal on a new central memory address path 21. In most cases, instruction processor 20 will simply maintain an internal counter which is incremented for each instruction of this type implicitly defining the next instruction, and which is reset by branch instructions to the specified instruction.

Buffer addressing control 22 receives each central memory address in the signal on path 21. Buffer addressin( control 22, too, performs a number of different functions internally and provides IWB address assignment and association as needed. Addressing control 22 maintains an internal address table recording the assignment of individual IWB addresses to central memory addresses. As each new central memory address is received on path 21, addressing control 22 searches its address table to determine whether an IWB address is assigned to it. If so, the assigned IWB address is provided in the signal on path 33.

If no IWB address is assigned to the just-received central memory address, addressing control 22 assigns an IWB address to the central memory address and records this assignment in the table. Since this typically involves reassigning the chosen IWB address from some other central memory address, after this assignment has been made, the instruction word stored at that location in buffer 18 is no longer valid. Accordingly, the read valid indicator for that location must be cleared, and that is accomplished by placing the reassigned IWB address or addresses in a signal on path 23. This signal is received by instruction word buffer 18 and, as explained earlier, causes buffer 18 to set the read valid indicator associated with that address to its first or cleared state. The new IWB address assigned to this central memory address is also placed in a signal on path 33, but since the read valid status for this IWB address is cleared, processor 20 is prevented temporarily from executing the instruction word stored at the location addressed thereby.

Each time an IWB address is reassigned, it is necessary to replace the old instruction word with the one from the central memory location to which the IWB address in question has been reassigned. This is accomplished in part by placing the new central memory address in the signal on path 25 along with the IWB address assigned to it on path 24. Write valid memory 29 and central memory 15 then cooperate to eventually provide the instruction word from this address's location in central memory.

Write valid memory 29 also receives the clear valid signal on path 23. Write valid memory 29 is similar to the internal read valid memory in instruction word buffer 18, in that it has a number of storage locations each addressable by an IWB address, and each able to store at least first and second indicator values corresponding to cleared and set status respectively. When a clear valid address signal is received on path 23, then write valid memory 29 causes the location or locations within it addressed by the clear valid signal to be set to their first or cleared state. The write valid memory 29 also provides on path 26 the status, set or cleared of the write valid indicator whose address is encoded in the signal on path 24. The individual indicator addressed by the IWB address on path 24 can further be set to its set or second value by a set signal on path 27. Thereafter, until another clear signal specifying this address is presented to write valid memory 29 on path 23, the status output on path 26 has its second value each time this address is encoded in the signal on path 24.

The write valid signal on path 26 forms one input to an AND gate 30. AND gate 30 is designed such that when a first value is present on path 26 and a second value is present on path 28, then the AND gate output on path 27 has its second value, and has its first value otherwise. As will be recalled, the busy signal carried on path 28 is set to its first value whenever the address queue or pipeline cannot accept a request and has its second value otherwise. Accordingly, a means is here provided to delay a request signal to central memory 15 until there is room in the address queue to accept another address. When both inputs of AND gate 30 have been satisifed, the request signal created thereby on path 27 causes central memory 15 to place the IWB address on path 24 and the central memory address on path 25 together in the address queue. Thus, the instruction word needed by instruction processor 20 will be eventually stored in instruction word buffer 18.

While it might seem that processing of further instructions must be delayed until the request address proceeds through the address queue and the desired instruction word is finally encoded in the signal on path 19, such is not the case in the preferred embodiment. This invention is intended to be used in a situation where instruction word look-ahead is present. Thus, an instruction word may be requested substantially in advance of the time that it will be needed by processor 20. Typical computer programs involve frequent looping episodes Hwherein a particular sequence of instructions is executed many times before processing of further instructions occurs. During this time of looping, individual instruction words which may be executed after the particular loop has been completed can be extracted from central memory 15 and placed in instruction word buffer 18 so that they can be executed without the need to wait for a response from central memory 15. It is thus essential that instruction words in general occupy sequences of addresses within central memory 15 because the typical look-ahead feature simply assumes that instruction words following in sequence are the ones to be executed at a later time.

In FIG. 1, this can be accomplished with a buffer addressing control 22 which has look-ahead capability. This, in its simplest form, is simply a means for incrementing each new central memory address received on path 21 to address the next sequential central memory location. Typically, this can be accomplished by providing an internal register in which the new central memory address can be stored and from which the IWB address on path 24 and central memory address on path 25 are provided. Each time the write valid memory 29 indicator whose address is carried on path 24 has its second value, then the internal look-ahead counter is advanced to the next central memory address. The address assignment table is searched to see whether an IWB address has been assigned to this new central memory address. If one has and the write valid indicator associated therewith has its second value, the central memory address can be incremented again and the test repeated. If one has not, then a new IWB address is assigned to it, the read and write valid indicators associated therewith are cleared and a request for the instruction word having the central memory address is placed in the address queue as explained above.

The buffer addressing control 22 further employs the write valid status signal on path 26 to prevent unnecessary central memory 15 read requests. This can arise, for example, in the situation where a block of IWB addresses are reassigned simultaneously, and then the program loops or branches before all of the reassigned address locations have requests for their new instruction words placed in the address queue. It can also arise in other contexts. In such a circumstance, without the write valid mechanism only the read valid memory in buffer 18 indicates whether the instruction word involved must be requested, and it cannot detect the condition where the address request has been placed in the address queue but not yet answered. By using write valid memory 29, the status of the individual indicators provide a means for detecting the presence of the request in the address queue. The write valid indicator status signal on path 26 prevents a further request including the IWB address involved from being placed in the address queue.

Since each request includes a unique IWB address and the corresponding indicator in write valid memory 29 is set when the request is accepted in the address queue, the status signal encoded on path 26 provides a criterion for immediately incrementing the central memory address stored in the look-ahead register in addressing control 22 as well. If and when the look-ahead address reaches a not-requested instruction word location, then the status carried on line 26 causes buffer addressing control 22 to cease further incrementing of the look-ahead address until the request for the current address's instruction word has been accepted by central memory 15.

All the above discussion is somewhat abstract in that individual elements of buffer addressing control 22 have not been explicitly defined. FIG. 2, to be explained below, is a much more specific embodiment which incorporates block IWB address reassignment and look-ahead addressing so as to make optimum use of the write valid memory mechanism. The following explanation of FIG. 1 provides additional insight into the operation of the embodiment therein.

To explain operation of apparatus constructed according to the diagram of FIG. 1, assume that a program comprising a series of instruction words is present in central memory 15, and that a branch instruction is executed placing the central memory address which specifies the starting instruction word in the signal on path 21. Assume that this initial central memory address will be treated by buffer addressing control 22, as explained above, as a central memory address to which no IWB address has been assigned. Accordingly, addressing control 22 assigns an IWB address to the initial central memory address. Since a new assignment of an IWB address has occurred, the write and read valid indicators having the IWB address just assigned are cleared by placing that IWB address on path 23. At the same time, the IWB address is placed on path 33 to specify the instruction word buffer 18 location from which instruction processor 20 will receive its first instruction word. The central memory address is further placed on path 25. The central memory address is also loaded into the internal look-ahead register from which it is placed on the IWB load address path 24. The clear write valid indicator in memory 29 addressed by the IWB load address on path 24 places an indicator value having its first state on path 26, satisfying a first input of AND gate 30. Assuming that the address queue is unfilled so that central memory 15 is providing a second value for its busy signal on path 28, the second input of AND gate 30 is also satisifed and a request signal issues on path 27 to central memory 15. This request signal causes the IWB load address on path 24 and the central memory address on path 25 to be accepted by the address queue in central memory 15. This request signal further provides a set signal on path 27 to write valid memory 29, causing the write valid indicator corresponding to the load address on path 24 to be set and the signal on path 26 to change to its second value. This signals buffer addressing control 22 to increment the central memory address in the internal look-ahead register and cause a new central memory address to be placed in the signal on path 25.

Addressing control 22 searches its internal address table to determine whether an IWB address has been assigned to this new central memory address. Usually, one will have already been assigned, because it is assumed that assignment occurs on a block basis so as to justify the use of a write valid memory mechanism in the first place. At any rate, the new IWB address is placed on path 24 only (because only a new central memory address specified by the signal on path 21 will cause an IWB execution address to be placed on path 33) and the incremented central memory address is encoded in the signal on path 25. If no new assignment of an IWB address occurred, no clear valid signal is placed on path 23. A procedure like that previously outlined causes a second instruction word to be loaded into buffer 18 at the address specified by the IWB address on path 24. Similarly, a new write valid status signal is generated eventually on path 26 when the indicator addressed by the IWB address on path 24 is set, which causes the central memory address stored in the internal look-ahead register to be incremented again.

This procedure continues until a branch or other instruction causes an out-of-sequence central memory address to be placed on path 21. Assume that the new central memory address specified is one which has already been loaded into instruction word buffer 18. In that case, when the assignment table is searched by addressing control 22, the assignment will be discovered and the appropriate IWB address will be placed in the signal on path 33. Since the assumption is that the instruction has already been loaded into the location specified by the IWB address on path 33, the associated read valid indicator has its second or set value so that instruction processor 20 can immediately begin processing the instruction word. It is expected that this will be the typical situation for the vast majority of instruction word executions, with the instruction word already present in buffer 18 so that addressing control 22 need only search the assignment table and issue the correct IWB address on path 33. This condition will exist because, in general, the next instruction to be executed is present in the sequence of instructions within a few increments from the address of the currently executing instruction, or alternatively has recently been executed and is therefore still in instruction word buffer 18. Each time in a particular program that the instruction processor 20 executes an instruction stored at a location having an address slightly larger than any instruction previously executed, the look-ahead feature should in most cases have already preloaded the following instruction words in buffer 18, or at the very least have placed requests for them in the address queue of central memory 15. If a particular loop is iterated several times, the write valid memory mechanism will prevent redundant requests for instruction words already requested but not yet loaded into instruction word buffer 18. Accordingly, substantial numbers of requests to central memory 15 can be avoided. Since the central memory will be busy with data word requests as well as with instruction word requests, the fewer central memory requests made, the more rapid is overall execution.

Turning then next to FIG. 2, the detailed block diagram of a particular digital computer design includes a preferred embodiment of this invention. As mentioned above, the instruction look-ahead feature in conjunction with block IWB address assignment justifies the use of a write valid memory to manage instruction word requests to a central memory. It is convenient to start the discussion here with central memory 59 which contains the instructions to be executed. Central memory 59 is very similar to central memory 15 discussed earlier in FIG. 1 in that it includes an address queue or pipeline feature. A central memory address encoded in a signal on path 43 and a block number encoded in a signal on path 62 are presented to central memory 59. The block number on path 62 forms a high-order portion of the instruction word buffer (IWB) address. In the embodiment here, a predetermined number of low-order bits in the central memory address on path 43 form the corresponding number of low-order bits of the IWB address, the block number being catenated thereto to form the complete IWB address. When a request signal is placed on path 61, central memory 59 accepts the central memory address encoded on path 43 and the block number in the signal on path 62 into its address queue. As with the device in FIG. 1, this address queue has a preselected length, and when it is not completely filled, a logical 1 signal, which indicates that another address can be accommodated in the queue, i.e., the queue is "not busy," is placed on the busy signal path 58. The instruction word at the location having the address encoded in the signal on path 43 is encoded as part of a central memory signal placed on path 67. The block number encoded in the signal on path 62 is catenated to the low-order bits of the central memory address encoded on path 43, and encoded as the rest of the central memory signal on path 66 to form the complete IWB address of the location at which the instruction is to be stored. This IWB address is applied to the instruction word buffer 68 at its load (LD) address input. The instruction encoded in the signal on path 67 is then stored in the location in the instruction word buffer 68 having the IWB address carried on path 66. The instruction word buffer 68 is preferably a very high-speed semiconductor memory which includes a gating network activated by the IWB address signal on path 66 so as to provide paths for the instruction encoded on path 67 to the specified storage location.

A separate read valid memory 65 receives the IWB address encoded on path 66 at its SET terminal. Read valid memory 65 in the preferred embodiment includes a set of addressable single bit registers or flip-flops, each individual one of these flip-flops being addressable by one of the instruction word buffer 68 addresses, so that a complete one-to-one correspondence exists between each read valid memory 65 address, and a corresponding one of the instruction word buffer 68 addresses. When an IWB address is received on path 66 at the SET input of read valid memory 65, the bit addressed thereby is set to a logical 1. To read read valid memory 65 the block number on path 57 and the low-order bits encoded on path 41$b$ respectively are catanated to form the high- and low-order bits of an address applied to the read or RD input of read valid memory 65. The contents of the flip-flop or register addressed thereby is encoded in the signal on path 71 as either a logical 1 or a logical 0. Finally, all the flip-flops having a common block number can be simultaneously cleared, or set to logical 0, by applying a clear signal on (CLR BLK) path 53.

Instruction word buffer 68 supplies individual instruction words encoded in the signal on path 70 to an instruction processor 69 and is addressed for reading in the same manner as is read valid memory 65. The IWB address of each instruction word supplied on path 70 is formed by the catenation of the block number carried on path 57 as the most significant bits with the least significant bits of the signal on path 41$b$ as the least significant bits of the IWB address. Instruction processor 69 executes each instruction when a RUN signal on path 72 is a logical $I$. This RUN signal is provided by AND gate 78, one of whose inputs is the read valid indicator flip-flop in read valid memory 65 which the IWB address from paths 57 and 41$b$ selects and which must be a logical 1 to allow execution of the instruction. A second input to AND gate 78 on path 77 must also be a logical 1, and its source will be discussed below.

The RUN signal on path 72 and the instruction word buffer 68 address formed by the signals on paths 57 and 41$b$ are supplied to the instruction processor 69 simultaneously. The instruction processor senses the the value of the RUN signal on path 72 and if this value is a logical 1, executes the instruction word encoded in the signal on path 70. If the value carried on path 72 is a logical 0, then instruction processor 69 ceases execution of instructions on path 70 for so long as path 71 carries a logical 0.

For purposes of this invention, as explained earlier, we can assume that the only output from instruction processor 69 are signals on paths 73 and 74 which specify the address in central memory 59 from which the next instruction must be taken. It has been previously stated that in the typical structure of a computer, addresses of instructions to be consecutively executed are in sequentially ascending numeric order, except for instructions (branch instructions) having the specific purpose of interrupting this order of execution.

The branch address encoded in the signal on path 74 and the increment signal on path 73 are used to set and change the central memory address which forms the contents of an execution address register 40. Each time a branch address is generated by execution of an instruction by processor 69, the branch address encoded in the signal on path 74 is accepted and stored by execution address register 40. Each time an increxent signal is generated on path 73 by instruction processor 69, the contents of execution address register 40 is incremented by whatever constant increment value is used in the addressing scheme, almost invariably 1. As implied by its name, the contents of execution address register 40 specifies the central memory address where the instruction to be executed next is located. However, recall that instruction processor 69 executes only instruction words supplied to it from instruction word buffer 68. Therefore, it is necessary to determine first of all, whether or not an instruction word whose address is contained in execution address register 40, is actually present within instruction word buffer 68 and if it is, what its address in instruction word buffer 68 actually is.

To accomplish this association, there is supplied a plurality of prefix registers 52, each of which has a different IWB block number identifying it. The number of prefix registers 52 thus equals the number of blocks into which instruction word buffer 68 is divided. Each of the several prefix registers 52 can store a different prefix, or that portion of the central memory addresses which does not comprise a portion of the IWB address. Execution address comparison means 56 receives a signal encoding the contents of all of the prefix registers 52 on data path 79 and compares each of these with the prefix of the central memory address stored in execution address register 40 and encoded in the signal on path 41a. Execution address comparison means 56 has two outputs. When equality between one of the prefix registers 52 contents and the prefix carried on path 41a is detected, its output on the equal signal path 77 is set to a logical 1, which satisifes the input to AND gate 78 alluded to earlier. When none of the prefix registers 52 contain a prefix equaling that of the address in execution address register 40, then the output on equal signal path 77 is set to a logical 0 , disabling AND gate 78 and removing the run signal on path 72 to instruction processor 69. The inequality condition typically results from execution of a branch instruction with a branch address of an instruction word not stored in instruction word buffer 68. Also, when equality is detected, the block number assigned to the one of the prefix registers 52 whose contents is equal to the prefix of the central memory address stored in execution address register 40 is encoded in a signal on path 57 and supplied as the high-order portion of the IWB read addresses to read valid memory 65 and instruction word buffer 68. In this preferred embodiment, the low-order portion of the IWB read address applied to read valid memory 65 and the buffer 68 comprises the portion of the address in execution address register 40 not forming the prefix, and is catenated to the block number on path 57. These can be conveniently referred to as the least significant bits (LSB) of the central memory address since the prefix preferably comprises high order bits (assuming a conventional binary representation for the address). This has been represented schematically by showing path 41 as splitting into a path 41a carrying the prefix and a path 41b carrying the LSB. In this manner, the read valid memory 65 and instruction word buffer 68 are caused to supply the respective read valid indicators and instruction word signals encoded on paths 71 and 70.

As was mentioned earlier, this invention is particularly appropriate for use in a digital computer system employing look-ahead for instruction addresses, placing instructions which are likely candidates for later execution in the instruction word buffer 68 before the need for them has been finally established. If they are eventually executed, execution speed is enhanced. If none of them are, only a few unnecessary central memory requests have been issued. The instruction look-ahead mechanism is controlled by the address contained in look-ahead address register 42. An initial address in look-ahead address register 42 is received from the instruction processor 69 on path 74, typically whenever an address is generated by execution of a branch instruction. Each branch or other instruction generating an out-of-sequence central memory address reference causes this new address to be placed in look-ahead address register 42. In general, non-branch instructions executed by instruction processor 69 do not affect the contents of look-ahead address register 42.

A digital adder 44 receives the address in execution address register 40 on path 41 and adds to it a maximum look-ahead count supplied externally (with respect to FIG. 2) on path 45. The sum of these two values is encoded in the signal on path 46 and supplied to one input of a comparison means 47. Comparison means 47 also receives on path 43 a signal encoding the address stored in look-ahead address register 42, and if the address in the signal on path 43 is equal to or greater than that in the signal on path 46, then its output signal on path 48 is set to a logical 0. AND gate 50 is thereby disabled and caused to present a signal on path 49 encoding a logical 0. Such a logical 0 prevents further incrementing of the contents of look-ahead address register 42. Should the address in look-ahead register 42 be less than the sum of the execution address register 40 contents and the maximum look-ahead count then comparison means 47 issues a logical 1 on path 48. Thus, the contents of look-ahead address register 42 cannot be incremented if the sum of the maxiumum look-ahead count in the signal on path 45 and the address stored in execution address register 40 is less than or equal to the contents of look-ahead address register 42.

Now, assuming for a minute that the signal on path 64 is also a logical 1, this causes AND gate 50 to generate a logical 1 signal on path 49 for the increment input of register 42 causing its contents to be incremented to specify the location of the next instruction in sequence in central memory 59. Thus it can be seen that the contents of look-ahead address register 42 can proceed asynchronously and independently from the non-branch sequencing of instructions for execution by processor 69.

Those skilled in the computer arts will appreciate the fact that only a very small percentage of instructions executed while running a program branch to locations far in the sequence of instructions from the location storing such a branch instruction. Thus, in most cases, the look-ahead function, combined with the fact that a previously executed instruction will remain for some time in buffer 68, allows most instructions to be immediately available for execution from buffer 68.

Each central memory address formed in look-ahead address register 42 may be used to generate a central memory request for the instruction word stored thereat. An associative procedure for address prefixes stored in look-ahead address register 42 is performed in a manner similar to that for prefixes stored in execution address register 40. A look-ahead address comparison means 54 receives all the prefix register 52 contents on path 79 and compares each of the prefixes therein stored with the prefix of the address in look-ahead address register 42 and encoded in the signal on path 43. Since there is, here too, no guarantee that a prefix stored in look-ahead address register 42 will be equal to any of those stored in prefix registers 52 (because the prefix of the address in register 42 also is subject to change by execution of a branch instruction at any time, or by incrementation), provision is made to replace the contents of one of the prefix registers 52 with the prefix contained in the look-ahead address register 42. This is initiated by the equality signal on path 55, which, as does the signal on path 77 from means 56, indicates whether or not equality between the look-ahead address register 42 prefix and any of the prefixes stored in prefix register 52 exists. The signal on path 55 may be considered to have a logical 1 value when equality is detected, and a logical 0 value otherwise. Buffer address assignment means 51, in response to a logical 0-valued signal on path 55 supplies a block number encoded in the signal on path 53 which enables the prefix register having that block number among all prefix registers 52 to accept and store the prefix from look-ahead register 42 and encoded in the signal on path 43a. The basis for prefix register assignment by buffer address assignment means 51 is not important here. One simple approach is to cycle through the block numbers incrementally, returning to the smallest from the largest. Another approach is to maintain a so-called least recently used (LRU) algorithm, wherein the prefix register 52, whose prefix is replaced, is the one which contains the LRU prefix. (In the case of an LRU replacement algorithm, use history must be available to buffer address assignment means 51, which purpose is served by dotted line path 62a).

At any rate, once the prefix contained in the address stored in look-ahead register 42 has been transferred on path 43a to one of the prefix registers 52, then the comparison performed by look-ahead address comparison means 54 detects equality, the equality signal on path 55 is set to a logical 1, and the block number of the prefix register 52 whose contents equals to the prefix of the address in look-ahead address register 42, is provided on path 62.

Let us now consider the operation of write valid memory 63 and its associated elements in this milieu, noting that this is a key aspect of the invention herein disclosed. The structure and operation of write valid memory 63 is very similar to that for read valid memory 65, as well as to that for the write valid memory 29 of FIG. 1. Write valid memory 63 comprises a plurality of storage locations, each of which can store a status indicator which in this embodiment is preferably only a single bit Each storage location has a unique address associated with a single one of the instruction word buffer 68 addresses, and in the preferred embodiment is equal to the instruction word buffer 68 address with which it is associated. Each status indicator stored in a write valid memory 63 location has a first and a second value, and conveniently, this can be considered to correspond to logical 1 and logical 0 values, respectively. The address space for write valid memory 63 is preferably constituted so that, as with instruction word buffer 68, a single block number of the several defining individual prefix registers 52 can be catenated as the most significant bits with least significant bits of a central memory address to form the unique address of a single storage location in write valid memory 63. Thus, a given block number value also defines a group of write valid memory 63 addresses.

As with read valid memory 65, write valid memory 63 can have individual storage locations set or read, and groups of storage locations identified by a block number can te cleared or set to logical 0. When buffer address assignment means 51 causes the prefix stored in an prefix register 52 to be changed, the block number encoded in the signal on path 53 is applied to a clear (CLR BLK) input of write valid memory 63 to cause the group of storage locations having addresses including that block number to be cleared, or set to their first or logical 0 values. Each time a new buffer address assignment occurs, the block number encoded in the signal on path 53 is applied to the CLR BLK input of write valid memory 63 causing those storage locations thereby identified to be set to their logical 0 values. Each time equality is detected between one of the prefix register 52 contents and the prefix of the address stored in look-ahead address register 42, the equality signal on path 55 is set to a logical 1 value by the look-ahead address comparison means 54. Furthermore, the look-ahead address comparison means 54 provides a block number signal on path 62 which is the block number of the prefix register 52 storing the equal prefix.

This block number signal on path 62 is applied to a block number input of an address gate 75. At the same time, the least significant bits of the address stored in look-ahead address register 42 are applied on path 43b to a LSB input of gate 75. These inputs on paths 62 and 43b to gate 75 with the block number as the high-order portion are catentated to form an address of a storage location in write valid memory 63. Gate 75 is activated by a request signal on path 61, allowing the catenated block number encoded in the signal on path 62 and the least significant bits encoded in the signal on path 43b to be applied as an IWB address on path 76 to the set input of write valid memory 63. The value encoded on path 76 represents the address of a specific storage location in write valid memory 63, and causes the indicator status in the storage location so specified to be set to its logical 1 or second value.

Write valid memory 63 is read by applying to its read (RD) input a block number in the signal on path 62 to which is catenated the least significant bits encoded in a signal on path 43b to form in combination an IWB address. The address thereby formed causes the contents of the storage location addressed to be encoded in the signal on path 64 as a write status indicator. The write status indicator on path 64 is provided to a so-called "inverting" input of AND gate 60 denoted by the small circle thereat, so that a logical 0, rather than a logical 1, satisfies this input of gate 60. The equality signal on path 55 from look-ahead address comparison means 54 provides a second input to AND gate 60. Recall that when equality was detected, a logical 1 value was produced on signal path 55, which value conventionally satisfies an AND gate input. The BUSY signal on path 58 from central memory 59 supplies a third input to AND gate 60. To invoke the reader's recall once more, a logical 1 value for the BUSY signal implies that the address queue of central memory 59 can accept another central memory address from the signal on path 43 along with an associated block number encoded in the signal on path 62. When all three conditions at the inputs of AND gate 60 are satisfied, a logical 1 signal on path 61 is created which forms a request (REQ) signal to central memory 59. The request signal on path 61 places the central memory address in the signal on path 43 and its associated block number or path 62 in the address queue. The request signal on path 61 also enables gate 75, allowing the least significant bits of the address stored in look-ahead address register 42 and encoded in the signal on path 43b, and the block number encoded in the signal on path 62 to be gated on path 76 to write valid memory 63. This changes the status indicator on path 64 to a logical 1, causing AND gate 60 to drop the request signal on path 61 and preventing central memory 59's address queue from accepting another central memory address and associated block number until a new look-ahead address is available.

On occasion, the catenation of the block number encoded in the signal on path 62 and the least significant bits encoded in the signal on path 43 form the address of a write valid memory 63 location whose status value is a logical 1. This implies at least that that address has already been placed in the address queue of central memory 59. (The instruction word at the location specified by the associated central memory address may in fact already have been retrieved and placed on path 67 and thereby loaded in instruction word buffer 68). At any rate, the logical 1 value on path 64 disables AND gate 60, preventing generation of a request signal on path 61 and an unreeded reference to central memory 59 to retrieve an instruction word for which a request has been generated. Addresses in the central memory 59 address queue are thus prevented from appearing therein more than once. It follows that if the instruction has already been loaded in instruction word buffer 68, re-reading of the instruction word from central memory 59 is also prevented.

For completeness and logical consistency, it should be mentioned that whenever a prefix register 52 assignment is changed, it is necessary to purge the address queue of central memory 59 so as to remove central memory address requests associated with this block number from the address queue, so as to avoid loading obsolete instruction words into these instruction word buffer 68 storage locations. There are various options for accomplishing this. One can maintain a set of counters, each one associated with a single block number, and cause the counter to be advanced by one each time a central memory address associated with its block number is inserted in the address queue, and to be decremented by one each time a signal issued on path 66 encodes a buffer address whose block number corresponds to that counter's associated block number. When the prefix in a prefix register 52 is changed, then the instruction words issuing in association with buffer addresses having that block number are discarded and setting cf read valid memory status words associated with that block number is suppressed until that counter's value is reduced to zero.

Alternatively, the address queue could be directly examined, and each central memory address and block number associated with it erased where the block number is that of the prefix register 52 whose prefix was changed. This problem and its solution is not dependent on the presence or absence of a write valid memory 63, and in fact, is a problem which must be dealt with regardless of the specific embodiment chosen.

It must be emphasized that the advantages which can be achieved by this invention are available only in digital computers whose normal addressing mode is the predetermined sequence type, and which is interrupted relatively infrequently by instructions which branch to addresses relatively remote in the instruction sequence. The first condition is normal hardware structure for modern stored program computers. The second can be achieved by careful program design. As previously mentioned, simultaneous or block assignment of storage locations in instruction word buffer 68 to central memory locations and use of an address queue or pipeline structure in central memory 59 references are also desirable. This third condition is necessary to justify the use of a write valid memory 63 since if IWB addresses are assigned on a one-at-a-time basis to central memory addresses, in general the instruction word can be requested from central memory 59 as soon as the assignment is made. The fourth condition is necessary since if no address queue or pipeline is employed, only a single central memory 59 reference is processed at any given time, and the read valid memory 65 serves the function of sensing acceptance of a read request by central memory 59.

In one preferred embodiment, four least significant bits are used in defining the instruction word buffer 68 addresses, and four prefix registers 52 are used to store individual prefixes. Therefore, these parameters define an instruction word buffer 68 having 64 storage locations with six bit addresses, two bits defining the block number and four defining the least significant bits. Hence there are four blocks, each of 16 instruction words. Obviously, other combinations and sizes are possible.

To aid in understanding operation of the system depicted in FIG. 2, assume that central memory 59 has instructions starting at address 10,000 (hexadecimal) as shown in Table I. Assume also that the upper four digits serving as the prefix and the lowest digit forms the LSB (four bits) of the IWB addresses. Thus, for address 1000 A, the prefix is 1000 and the LSB=1010 binary (=A hexadecimal). Since the precise function of individual instruction words is irrelevant except as to whether they are branch or non-branch instructions, other aspects of their functions are omitted. Further, assume the maximum look-ahead count provided on path 45 is 8. Assume that none of the contents of addresses 10,000-1001 F are present in instruction word buffer 68. Assume that none of the prefix registers 52 contain the prefix 1000. Further assume a branch from a remote instruction word in the instruction sequence provides the value 10,000 in the signal on path 74.

TABLE I

| CENTRAL MEMORY ADDRESS (Hexadecimal) | INSTRUCTION BRANCH CONDITION |
| --- | --- |
| 10000 | Non-branch |
| 10001 | Non-branch |
| 10002 | Non-branch |
| 10003 | Non-branch |
| 10004 | Branch to 10002 40 times and then do not branch |
| 10005 | Non-branch |
| 10006 | Non-branch |
| 10007 | Non-branch |
| 10008 | Non-branch |
| 10009 | Non-branch |
| 1000A | Non-branch |
| 1000B | Non-branch |
| 1000C | Branch to 10009 25 times and then do not branch |
| 1000D | Non-branch |
| 1000E | Non-branch |
| 1000F | Non-branch |
| 10010 | Non-branch |
| 10011 | Non-branch |

TABLE I-continued

| CENTRAL MEMORY ADDRESS (Hexadecimal) | INSTRUCTION BRANCH CONDITION |
|---|---|
| 10012 | Branch to 10007 10 times and then do not branch |
| 10013 | Non-branch |
| . | . |
| . | . |
| . | . |

Execution of such a program segment then proceeds as follows: The address 10,000 is loaded into execution address register 40 and look-ahead address register 42. Since the prefix 1000 is not present in any of the prefix registers 52, the execution address comparison means 56 and the look-ahead address comparison means 54 both provide logical 0 values on their equality signals carried respectively on paths 77 and 55. The logical 0 on path 77 causes the RUN signal on path 72 to be a 0, halting execution of instructions by instruction processor 69. Furthermore, the logical 0 present on path 55 causes buffer address assignment means 51 to select a prefix register in which to place the prefix 1000 and place the block number of the selected prefix register on path 53. This causes the prefix 1000 to shortly appear encoded in the prefix register signals on path 79. The execution address comparison means 56 and look-ahead address comparison means 54 then both detect equality and change the values of their respective equality signals on paths 77 and 55 to logical 1's. The block number on path 53 also causes the block of indicators associated with that block number in write valid memory 63 and read valid memory 65 to be cleared to logical 0's. Considering only read valid memory 65 first, the block number carried on path 57 is equal to the block number originally provided on path 53 by virtue of the relationship between prefix register 52 and execution address comparison means 56. The four least significant bits of address 10,000 carried on path 41b are 0000. The indicator in read valid memory 65 addressed by the signals on paths 57 and 41b contains a logical 0 which is placed in the signal on path 71. Accordingly, AND gate 78 continues to provide a logical 0 on path 72, and instruction processor 69 continues to wait.

The corresponding indicator in write valid memory 63 is addressed by the same block number on path 62 and the identical least significant bits on path 43b. Accordingly, write valid memory 63 also provides a logical 0 signal on path 64 as its output, enabling its input to AND gate 60 and disabling its input to AND gate 50. Since it was assumed that central memory 59 was not busy, the BUSY signal on path 58 is also a logical 1, causing AND gate 60 to have all three of its inputs satisfied and a request signal to be placed on path 61. This request signal gates the central memory address (10000) on path 43 and the block number of the prefix register 52 storing the prefix 1000 to the address queue of central memory 59. The request signal on path 61 also enables gate 75, gating the block number from look-ahead address comparison means 54 on path 62 and the least significant bits from look-ahead address register 42 on path 43b as the IWB address on path 76 to write valid memory 63. The IWB address on path 76 causes the write valid indicator specified by it to be set; hence, the signal on path 64 changes from a logical 0 to a logical 1, disabling AND gate 60 and enabling its input to AND gate 50.

Concurrently, with these previously described activities, adder 44 forms the sum of the contents of execution address register 40, 10,000, and the maximum look-ahead count on path 45. Recall that the look-ahead count on path 45 is assumed to be 8. Since 10,000+8 is larger than the 10,000 contained in look-ahead address register 42, comparison means 47 provides a logical 1 on path 48, which, with the logical 1 on path 64 as explained earlier, enables AND gate 50. The logical 1 thusly provided on path 49 causes look-ahead address register 42 to be incremented to 10,001. Meanwhile, the address value 10000 on path 43 and the block number on path 62 which were gated to central memory 59 by the request signal on path 61 are being processed. In due time, central memory 59 responds with the instruction word stored in central memory address 10000 and the IWB address in the signals encoded respectively on paths 67 and 66. This causes the status of the indicator in read valid memory 65 addressed thereby to be set to a logical 1 and the instruction in the signal on path 67 to be loaded into the address of instruction word buffer 68 specified by the signal on path 66. Thus, the instruction word stored at address 10000 of central memory 59 is now available on path 70 for execution. Since both inputs to AND gate 78 are logical 1's, its output on path 72 changes to a logical 1, indicating to instruction processor 69 that it may execute the instruction word on path 70. Since it is specified in Table I that this instruction is a non-branch type, the signal on path 73 generated by instruction processor 69 causes execution address register 40 contents to be incremented to 10,001.

While the memory request for address 10,000 was passing through the address queue, additional requests for addresses 10,001, 10,002, etc., were being generated in the same fashion and were being placed in the address queue. Since the address queue may delay from 10 to 20 instruction word execution times until the instruction word actually requested is provided by central memory 59 on path 67, it is very likely that requests for addresses 10,001-10,008 have been already placed in the address queue by the time instruction processor 69 finally receives the instruction word originally stored at address 10,000. Since the cycle time of central memory 59 may be slower than a single instruction word execution time, execution of the instructions at addresses 10,001, 10,002, 10,003, etc., proceeds at a slower pace than instruction processor 69 executes individual instruction words previously loaded into buffer 68. Note that address comparison means 47 disables AND gate 50 when the contents of look-ahead address register 42 is advanced to 10008, so that a request for the instruction word at address 10009 cannot be issued until the contents of execution address register is incremented to 10001.

Sequential execution of instruction words continues until interrupted by the branch instruction to address 10,002, which is stored at central memory 59 address 10,004. Note that the branch instruction stored at 10,004 is a conditional branch instruction which causes the branch to address 10002 to occur 40 times, after which execution continues with the instruction at address 10,005.

Since the instruction words stored at central memory address 10,002, 10,003 and 10,004 are all now present in instruction word buffer 68 as each branch to address 10002 occurs, execution of these instructions can occur at the highest speed possible for instruction processor 69. As each branch to address 10,002 occurs, the contents of both execution address register 40 and look-ahead address register 42 is set to changed to 10,002. Since the look-ahead process involving look-ahead address register 42, prefix register 52, look-ahead address comparison means 54, and write valid memory 63 occurs very rapidly relative even to execution of a single instruction word by instruction processor 69, it is almost certain that look-ahead address register 42 will have counted forward and caused a request for the instruction word at address 1000C (=0004+8) hexadecimal to be placed in the central memory 59 address queue. As each branch to the instruction word at address 10002 occurs, the look-ahead address register 42 contents are reset to 10002. It can be seen that with a write valid memory 63 which is read for each indicator in the address sequence 10003, 10004, 10005, etc., the logical 1 status produced on path 64 disables that input for AND gate 60, and prevents generation of additional requests for instruction words stored at these central memory addresses but not yet loaded into instruction word buffer 68. However, with the presence of write valid memory 63, these unnecessary requests are not generated.

It is advantageous to prevent such multiple requests for the instruction word stored in a single address, because it can, in certain circumstances, occur frequently enough to appreciably slow the response of central memory, and therefore slow the rate of processing. It can be seen that the way in which I accomplish this is by making use of the instruction word buffer address to identify each request to central memory. The IWB address can be used to reference the write valid memory 63 storage locations, each of which store a value indicating the status of a central memory address regarding its presence or absence in the address queue.

Eventually, the branch condition of the instruction word stored in address 10,004 is no longer satisfied, and the contents of execution address register 40 is merely incremented to 10,005. Since this and succeeding instruction words have already been stored in instruction word buffer 68, instruction processor 69 can proceed at its maximum speed in executing this and succeeding instruction words, until execution "catches up" with the central memory 59 as it answers requests for succeeding instruction words. If as in the example shown, address 1000C contains a branch to address 10,009, instruction word execution can continue to proceed at maximum speed. While the loop involving addresses 10,009-1000C executes, tte look-ahead feature can be requesting instruction words stored at addresses 1000D, 1000E, etc., so that again, no further time need be lost waiting for central memory 59 to respond to individual requests for these instruction words.

When the look-ahead address register 42 increments to 10010, a new prefix is formed. A prefix register 52, preferably not the one containing 1000, is reassigned to hold 1001 by buffer address assignment means 51 and the look-ahead process continues without interrupting instruction word execution by instruction processor 69. The buffer address assignment means should select a prefix register 52 which does not contain 1000 so as to not interfere with current execution of instruction words. Note also that a branch from an address with a prefix 1001 to an address with a prefix 1000 can occur without further reference to central memory 59, as is necessary efficiently execute the loop contained in the storage locations 10007-10012. Execution of further instruction words continues in the same fashion.

This describes my invention; what I desire to protect by Letters Patent is:

1. In a stored program digital computer including an addressable central memory receiving address signals and for storing individually addressable instruction words, each address signal encoding a central memory address and an instruction word buffer address, said central memory responsive to a request signal placing the central memory address and the instruction word buffer address encoded in the current address signal in an address queue and supplying for each central memory address in the address queue a central memory signal encoding the instruction word stored in that central memory address and the associated instruction word buffer address; an instruction word buffer receiving the central memory signal and storing each instruction word encoded therein at the address specified by the associated instruction word buffer address encoded therein, said instruction word buffer further supplying responsive to an instruction word buffer address signal an instruction word signal encoding individual ones of instruction words stored in the instruction word buffer; an instruction processor issuing instruction word buffer address signals to the instruction word buffer and receiving instruction word signals from the instruction word buffer responsive to the instruction word buffer address signals, and responsive to instruction words encoded in the instruction word signals issuing a plurality of processor signals each specifying a central memory address; and buffer address assignment means receiving each such processor signal and responsive to each such processor signal selecting an instruction word buffer address to be associated with the specified central memory address, and supplying to the central memory an address signal encoding the central memory address and the instruction word buffer address associated with it, an improved address requesting mechanism including (a) an addressable write valid memory comprising a plurality of storage locations, each storing a write status indicator, each said storage location having an address associated with an instruction word buffer address and each write status indicator having first and second values, said write valid memory receiving the request signals and the address signals supplied to the central memory and responsive to the request signal, setting to its second value the write status indicator in the storage location whose address is associated with the instruction word buffer address encoded in the address signal, and further, the write valid memory responsive to the address signal supplying a status signal encoding the value of the write status indicator in the storage location whose address is associated with that of the instruction word buffer address encoded therein; and (b) gate means receiving a busy signal and the status signal from the write valid memory for, responsive to concurrent first values of the busy and status signals issuing a request signal to the central memory;

and wherein the central memory further comprises queue monitoring means for issuing a busy signal having a second value responsive to the presence of at least a predetermined number of central memory addresses in the queue and a first value otherwise, whereby addresses in the central memory instruction address queue are prevented from appearing therein more than once at any time.

2. The apparatus of claim 1 wherein the write valid memory includes a plurality of storage locations each of which have an address identical to a different one of the instruction word buffer addresses.

3. The apparatus of claim 2 wherein the buffer address assignment means further comprises means responsive to the selection of certain ones of the instruction word buffer addresses for setting the status word indicator in the write valid memory storage location having the address equal to each selected instruction word buffer address to its first value.

4. The apparatus of claim 2 wherein the buffer address assignment means further comprises means responsive to certain ones of the processor signals for selecting a plurality of instruction word buffer addresses and setting each status word indicator in the write valid memory storage locations having addresses equal to the selected instruction word buffer addresses to its first value.

* * * * *